United States Patent Office 3,657,253
Patented Apr. 18, 1972

3,657,253
3-ARYLOXY-8-CARBAMOYLNORTROPANES
Grover Cleveland Helsley and Robert Frederick Boswell, Jr., Richmond, Va., assignors to A. H. Robins Company Incorporated, Richmond, Va.
No Drawing. Filed Aug. 31, 1970, Ser. No. 68,593
Int. Cl. C07d 43/06
U.S. Cl. 260—292          11 Claims

ABSTRACT OF THE DISCLOSURE

3α-aryloxy-8-carbamoylnortropanes and 3β - aryloxy-8-carbamoylnortropanes which are prepared from the precursor 3α-aryloxynortropanes and 3β-ayloxynortropanes are described. The procedures whereby the precursor are prepared with retention of isomeric configuration are described. The novel compounds have anticonvulsant properties.

---

The present invention relates to 3,8-disubstituted nortropanes and is more particularly concerned with 3-aryloxy-8-carbamoylnortropanes, their alpha and beta isomeric configurations and to methods for producing them.

As determined by standard pharmacological procedures, the novel compounds described hereinafter have utility as physiologically active agents and are particularly useful as anticonvulsants.

The invention is especially concerned with novel compounds having the formula:

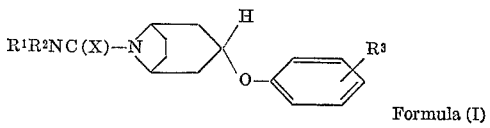

Formula (I)

wherein:
$R^1$ and $R^2$ are selected from the group consisting of hydrogen, lower alkyl and phenyl,
$R^3$ is selected from the group consisting of hydrogen, trifluoromethyl, bromine and chlorine, and
X is selected from the group consisting of oxygen and sulfur.

The novel compounds of Formula I described and claimed hereinafter exist in alpha and beta isomeric configurations as determined by the spatial relationship between the oxygen atom of the 3-aryloxy radical and the nitrogen atom. The starting materials for the novel compounds of Formula I are the 3α-aryloxynortropanes and 3β-aryloxynortropanes represented by the following structural formula:

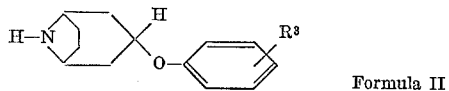

Formula II

In one of its novel aspects the present invention is concerned with the stereospecific reaction between a nortropine and fluorobenzene and/or a substituted fluorobenzene to provide a stereochemically pure 3-arylether. Thus, the reaction of 8-benzyl-3α-nortropine with m-fluorobenzotrifluoride provides 8-benzyl-3α-(m-trifluoromethylphenoxy)nortropane, the retention of isomeric configuration being established by nuclear magnetic resonance studies.

The novel compounds of Formula I were tested for anticonvulsant activity in female mice (ICR strain) with modifications of the methods of Swinyard et al. (H. A. Swinyard, W. C. Brown, and L. S. Goodman, J. Pharmacoll. Exptl. Therap., 106, 319 (1962)). Animals were challenged with electroshock or metrazole, hind-leg extension being the end point in both tests. The compounds were dissolved or suspended in water and were administered intraperitoneally, 30 or 60 minutes respectively, prior to challenge. Five mice were used for each dose. Effective dose 50 values were determined by the method of Litchfield and Wilcoxon (J. T. Litchfield, Jr., and F. Wilcoxon, J. Pharmacol. Exptl. Therap., 96, 99 (1949)). The pharmacological test results are summarized below in Table I.

TABLE I

| Compound | Electroshock $ED_{50}$ | Metrazole $ED_{50}$ |
|---|---|---|
| Example 3 | 27 | 47 |
| Example 5 | 42 | 53 |
| Example 6 | 28 | 72 |
| Example 7 | 50 | |
| Example 8 | 68 | |

It is, therefore an object of the present invention to provide novel 3-aryloxy-8-carbamoylnortropanes. It is a further object to provide the novel compounds of the invention in their alpha and beta isomeric configurations. A still further object is to provide novel methods for producing the compounds of Formula I. Additional objects will be apparent to one skilled in the art from the following detailed description of the invention.

In the definition of terms used throughout the specification and the appended claims, the terms have the following significance.

"Lower-alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like.

The term "carbamoyl" as used herein includes the unsubstituted carbamoyl group, the N-substituted carbamoyl group, and the N,N-disubstituted carbamoyl group.

The N,N-disubstituted carbamoyl halide intermediates used in the present invention are prepared as disclosed in U.S. Pat. No. 3,499,002.

The starting materials for the compounds of Formula II are 8-benzyl-3α-nortropine and 8-benzyl-3β-nortropine which are prepared according to the methods described by K. Nador et al., Arzneimittel-Forsch. 12, 305–309 (1962).

The following Chart I illustrates the novel synthetic method used to prepare the compounds of Formula II. In Chart I, $R^3$ has the values previously assigned.

CHART I

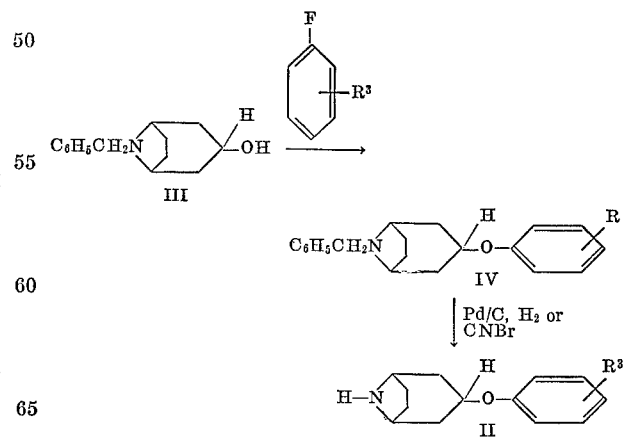

The compounds of Formula II are prepared by the general procedure given below.

A stirred suspension of an alkali metal hydride or an alkali metal amide, illustratively sodium hydride, in an inert solvent such as dimethylformamide is treated with a nortropine III (alpha or beta isomer) and stirring is continued at or about room temperature for a short period of time and then the reaction mixture is heated to about 60–80° C. until the evolution of gas ceases. The reaction mixture is then treated with a solution of an appropriately substituted fluorobenzene dissolved in the same solvent and heating is continued at or about 60–80° C. for a period of from about three to about seven hours. The reaction mixture is then cooled, treated with an equal volume of water and the separated oil is extracted with a suitable solvent, illustratively benzene. The combined extracts are washed with water and dried over a suitable drying agent such as magnesium sulfate. The solvent is evaporated from the dried organic solution and the residue material which may be an oil is distilled at reduced pressure to give the 8-benzyl-3-aryloxynortropane IV having the same isomeric configuration as the nortropine III.

The 8-benzyl-3-aryloxynortropane IV is dissolved in a suitable solvent as, for example, ethanol, a noble metal catalyst such as palladium is added and the solution is shaken in an hydrogen atmosphere at about 60° C. until one equivalent of hydrogen is absorbed. Hydrogenolysis occurs readily to give the 8-arylnortropane II which is isolated from the hydrogenolysis mixture by filtration, evaporation of the solvent, and distillation of the residual oil under reduced pressure.

3-aryloxynortropanes II wherein $R^3$ is a halogen atom as, for example, chlorine or bromine, are prepared from the 8-benzyl precursors by debenzylation using cyanogen bromide. An 8-benzyl-3-aryloxynortropane IV is reacted with slight excess of cyanogen bromide in a dry inert organic solvent, illustratively chloroform; the solvent is evaporated after the reaction is completed and the residual 8-cyano-3-aryloxynortropane is refluxed in concentrated hydrochloric acid for an extended period of time up to about 72 hours. The 3-aryloxynortropane is isolated from the reaction mixture by cooling, making the solution strongly basic with 50% sodium hydroxide solution, extracting the base insoluble oil with a suitable organic solvent as, for example, benzene, combining the extracts, washing them with water, drying over magnesium sulfate and evaporating the solvent. The residual oil is isolated by distillation in vacuo.

In general, the novel compounds of the present invention are prepared by reacting a 3α-aryloxynortropane or a 3β-aryloxynortropane with an alkyl isocyanate aryl isocyanate, alkyl isothiocyanate, aryl isothiocyanate, N,N-disubstituted carbamoyl halide or nitrourea in accordance with the following graphic equation:

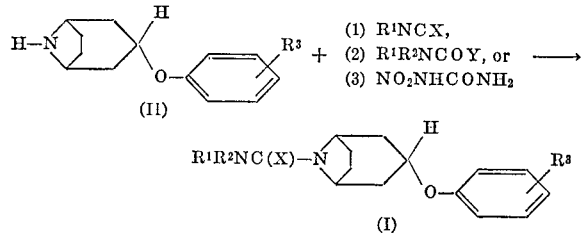

wherein $R^1$, $R^2$, $R^3$ and X have the same meaning ascribed to them above and Y is halogen, preferably chlorine.

In the preferred method of preparing the novel compounds, the reaction materials and conditions for the above identification reactions are general as follows:

The hydrogen atom of the secondary amine group of the 8-aryloxynortropane nucleus exhibits all the reactive properties of a secondary amino group and enters readily into conventional displacement reactions with a variety of reactive compounds including, for example, N,N-disubstituted carbamoyl halides and reactive species as, for example, alkyl isocyanates, aryl isocyanates, alkyl isothiocyanates, aryl isothiocyanates and nitrourea.

The 8-aryloxynortropane II prepared as described above is reacted with a compound containing a reactive halogen atom as, for example, an N,N-disubstituted carbamoyl halide in a dry organic solvent, illustratively benzene, containing an alkali metal salt such as sodium carbonate as an acid binder. The reaction is preferably carried out at the reflux temperature of the selected organic solvent. Following the reaction period the cooled mixture is washed with water, the organic layer is separated, dried over a suitable drying agent and concentrated. The crude product is purified by conventional laboratory procedures as, for example, crystallization, chromatography, and the like. The reaction of an 8-aryloxynortropane II with a reactive specie such as an aryl isocyanate, an alkyl isocyanate, an aryl isothiocyanate or an alkyl isothiocyanate is generally carried out by slowly adding a solution of the 8-aryloxynortropane in dry benzene to a solution of the selected isocyanate or isothiocyanate in the same dry solvent. Following the addition, the reaction mixture is stirred at ambient temperature for an additional period of time of from about one to about three hours and then the solvent is evaporated from the reaction mixture at reduced pressure. The residual oil remaining after evaporation of the solvent generally crystallizes on standing and is further purified by recrystallization from a suitable solvent or solvent mixture.

When the reactant is nitrourea, the 8-aryloxynortropane and nitrourea are reacted together in a lower alkanol solvent as, for example, ethanol, with gentle heating until the evolution of gas ceases and then at reflux temperature for a brief period of from about 15 minutes to about one hour. The product is isolated from the reaction mixture as described above.

For specific insight into the type of reaction involved, the intermediates therefor and the manner of carrying them out, and the novel compounds, some of these are specifically set forth in a series of specific preparations and examples which follow. It is to be understood the examples are given by way of illustration only and are not to be construed as limiting.

PREPARATION 1

8-benzyl-3α-(m-trifluoromethylphenoxy) nortropane oxalate

A stirred suspension of 6.0 g. (0.25 mole) of sodium hydride in 200 ml. of dimethylformamide was treated slowly with a solution of 34.8 g. (0.16 mole) of 8-benzyl-3α-nortropine in 75 ml. of dimethylformamide after which the stirred mixture was heated at 65–70° C. until the evolution of gas ceased. A solution of 41.0 g. (0.25 mole) of m-fluorobenzotrifluoride in 20 ml. of dimethylformamide was added and the mixture was then heated at 65–70° C. for five hours, cooled and treated with 800 ml. of water. The oil which separated was extracted with benzene and the combined benzene extracts washed with water and dried over magnesium sulfate. The solvent was evaporated from the dried organic solution and the residual oil was distilled at reduced pressure; B.P. 153–156° C./0.05 mm.; 39.2 g. (68% yield). A portion of the free base was converted to the oxalate salt which melted at 204–206° C. (with decomposition) after it was recrystallized from an isopropanol-ethanol mixture.

Analysis.—Calculated for $C_{23}H_{24}F_3NO_5$ (percent): C, 61.21; H, 5.36; N, 3.10. Found (percent): C, 61.03; H, 5.37; N, 3.19.

PREPARATION 2

8-benzyl-3β-(m-trifluoromethylphenoxy) nortropane oxalate

A stirred suspension of 3.6 g. (0.15 mole) of sodium hydride in 200 ml. of dimethylformamide was treated slowly with a solution of 20.0 g. (0.091 mole) of 8-benzyl-3β-nortropine in 50 ml. of dimethylformamide after which the stirred mixture was heated at 65–70° C. until the evolution of gas ceased. m-Fluorobenzotrifluoride (18.0 g.; 0.11 mole) was added to the reaction mixture with stirring and heating (65–70° C.) continued for 16 hours.

The cooled mixture was treated with 800 ml. of water and the water-insoluble oil extracted with benzene. The combined benzene extracts were washed with water, dried (magnesium sulfate) and the solvent evaporated. The residual oil was distilled at reduced pressure and the fraction boiling at 156–158° C./0.10 mm. collected. The light yellow oil weighed 21 g. (66% yield). A sample of the free base was converted to the oxalate salt which was recrystallized from an isopropanol-isopropyl ether mixture. The white oxalate salt melted at 148–150° C.

*Analysis.*—Calculated for $C_{23}H_{24}F_3NO_5$ (percent): C, 61.21; H, 5.36; N, 3.10. Found (percent): C, 61.16; H, 5.35; N, 3.05.

Utilizing the process of Preparation 2 above, the following compounds are prepared from the stated ingredients:

8 - benzyl - 3β-(p-trifluoromethylphenoxy)nortropane is prepared by reacting 8-benzyl-3β-nortropine and p-fluorobenzotrifluoride;

8-benzyl-3β-phenoxynortropane is prepared by reacting 8-benzyl-3β-nortropine and fluorobenzene;

8-benzyl-3β-(o-bromophenoxy)nortropane is prepared by reacting 8-benzyl-3β-nortropine and o-bromofluorobenzene; and 8-benzyl-3β-(p-chlorophenoxy)nortropane is prepared by reacting 8-benzyl-3β-nortropine and p-chlorofluorobenzene.

PREPARATION 3

8-benzyl-3α-(p-trifluoromethylphenoxy)nortropane hydrochloride

To a stirred suspension of 2.4 g. (0.10 mole) of sodium hydride in 50 ml. of dimethylformamide was added slowly a solution of 10.0 g. (0.046 mole) of 8-benzyl-3α-nortropine in 40 ml. of dimethylformamide after which the stirred mixture was heated at 65–70° C. until the evolution of gas ceased. A solution of 9.0 g. (0.055 mole) of p-fluorobenzotrifluoride in 20 ml. of dimethylformamide was added and the reaction mixture was stirred at 70–75° C. for two hours, cooled, and treated with 300 ml. of cold water. The water-insoluble oil which separated was extracted with benzene and the combined extracts were washed with water and then dried over magnesium sulfate. The dried solution was evaporated and the residual oil treated with ethereal hydrogen chloride. The white crystalline hydrochloride salt which formed melted with some decomposition at 235–238° C. and weighed 11.8 g. (71% yield).

*Analysis.*—Calculated for $C_{21}H_{23}ClF_3NO$ (percent): C, 63.39; H, 5.83; N, 3.52. Found (percent): C, 63.37; H, 5.91; N, 3.38.

Utilizing the process of Preparation 3 above, the following compounds are prepared from the stated ingredients:

8-benzyl-3α-phenoxynortropane is prepared by reacting 8-benzyl-3α-nortropine and fluorobenzene;

8-benzyl-3α-(o-bromophenoxy)nortropane is prepared by reacting 8-benzyl-3α-nortropine and o-bromofluorobenzene; and 8-benzyl-3α-(p-chlorophenoxy)nortropane is prepared by reacting 8-benzyl - 3α - nortropine and p-chlorofluorobenzene.

PREPARATION 4

3α-(m-trifluoromethylphenoxy)nortropane hydrochloride

A solution of 32 g. of 8-benzyl-3α-(m-trifluoromethylphenoxy)nortropane in 250 ml. of 95% ethanol containing 5 g. of palladium-on-charcoal catalyst was shaken in three atmospheres of hydrogen at 60° C. until one equivalent of hydrogen was absorbed. The cooled suspension was filtered, the solvent was evaporated at reduced pressure, the residual oil was taken up in benzene, washed with water, dried over magnesium sulfate and the solvent evaporated. The basic residue weighed 22.0 g. (92% yield). A portion of the base was converted to the hydrochloride salt which melted at 227–230.5° C. after it was recrystallized from an isopropanol-isopropyl ether mixture.

*Analysis.*—Calculated for $C_{14}H_{17}ClF_3NO$ (percent): C, 54.62; H, 5.57; N, 4.58. Found (percent): C, 54.71; H, 5.58; N, 4.45.

Utilizing the above process, 3α-phenoxynortropane is obtained by hydrogenolysis of 8-benzyl-3α-phenoxynortropane.

PREPARATION 5

3β-(m-trifluoromethylphenoxy)nortropane hydrochloride 8-benzyl - 3β - (m-trifluoromethylphenoxy)nortropane (20.0 g.) was debenzylated using the procedure of Preparation 4 to give 12.0 g. (80% yield) of 3β-(m-trifluoromethylphenoxy)nortropane. The hydrochloride salt melted at 218–220° C. after it was recrystallized from an isopropanol-isopropyl ether mixture.

*Analysis.*—Calculated for $C_{14}H_{17}ClF_3NO$ (percent): C, 54.62; H, 5.57; N, 4.58. Found (percent): C, 54.80; H, 5.57; N, 4.53.

Utilizing the procedure of Preparation 4, the following compounds are prepared from the stated ingredients:

3β-(p-trifluoromethylphenoxy)nortropane is obtained by hydrogenolysis of 8-benzyl-3β-(p-trifluoromethylphenoxy)nortropane; and 3β-phenoxynortropane is obtained by hydrogenolysis of 8-benzyl-3β-phenoxynortropane.

PREPARATION 6

3α-(p-trifluoromethylphenoxy)nortropane hydrochloride 8-benzyl - 3α - (p-trifluoromethylphenoxy)nortropane hydrochloride (9.5 g.) was debenzylated using the procedure of Preparation 4. The white hydrochloride salt isolated from the reduction mixture weighed 6.2 g. (84% yield) and melted at 280–283° C. The salt melted at 283–285° C. after it was recrystallized from isopropanol.

*Analysis.*—Calculated for $C_{14}H_{17}F_3ClNo$ (percent): C, 54.62; H, 5.57; N, 4.58. Found (percent): C, 54.58; H, 5.57; N, 4.48.

PREPARATION 7

3α-(o-bromophenoxy)nortropane

To a stirred solution of 44.6 g. (0.43 mole) of cyanogen bromide in 400 ml. of chloroform was added over a period of four hours, 105 g. (0.31 mole) of 8-benzyl-3α-(o-bromophenoxy)nortropane. The mixture was refluxed one hour, the chloroform was evaporated at reduced pressure, and a solution of the residual oil in 1200 ml. of concentrated hydrochloride acid was refluxed for a period of 72 hours. The mixture was made strongly basic using 50% sodium hydroxide, the base-insoluble oil which separated was extracted with benzene and the combined benzene extracts were washed with water, dried over magnesium sulfate and the solvent evaporated. The residual oil was distilled in vacuo to give 3α-(o-bromophenoxy)nortropane.

Utilizing the procedure of Preparation 7, the following compounds are prepared from the stated ingredients:

3α-(p-chlorophenoxy)nortropane is prepared by reacting 8-benzyl-3α-(p-chlorophenoxy)nortropane with cyanogen bromide and hydrolyzing the resulting 8-cyano-3α-(p-chlorophenoxy) nortropane compound in concentrated hydrochloric acid;

3β-(o-bromophenoxy)nortropane is prepared by reacting 8-benzyl-3β-(o-bromophenoxy)nortropane with cyanogen bromide and hydrolyzing the 8-cyano-3β-(o-bromophenoxy)nortropane in concentrated hydrochloric acid; and 3β-(p-chlorophenoxy)nortropane is prepared by reacting 8-benzyl-3β-(p-chlorophenoxy)nortropane with cyanogen bromide and hydrolyzing the resulting 8-cyanogen-3β-(p-chlorophenoxy)nortropane in concentrated hydrochloric acid.

EXAMPLE 1

8-carbamoyl-3α-(m-trifluoromethylphenoxy)nortropane

A stirred mixture of 4.1 g. (0.015 mole) of 3α-(m-trifluoromethylphenoxy)nortropane, 2.0 g. (0.018 mole) of nitrourea and 150 ml. of 95% ethanol was heated gently until the evolution of gas ceased and then at reflux for 15 minutes. The cooled mixture was treated with 300 ml. of water and the crystalline product which separated was collected by filtration, dried, and recrystallized from an isooctane-benzene mixture. The white product melted at 106–109° C. and weighed 2.9 g. (62% yield).

*Analysis.*—Calculated for $C_{15}H_{17}F_3N_2O_2$ (percent): C, 57.32; H, 5.45; N, 8.91. Found (percent): C, 57.75; H, 5.46; N, 8.71.

Utilizing the procedure of Example 1, 8-carbamoyl-3α-(o-bromophenoxy)nortropane is prepared by reacting 3α-(o-bromophenoxy)nortropane and nitrourea.

EXAMPLE 2

8-carbamoyl-3α-(p-trifluoromethylphenoxy)nortropane

A mixture of 2.0 g. (0.0074 mole) of 3α-(p-trifluoromethylphenoxy)nortropane, 1.4 g. (0.013 mole) of nitrourea and 60 ml. of 95% ethanol was heated gently until the evolution of gas ceased. The mixture was refluxed for approximately one hour, cooled, filtered and the filtrate was treated with 100 ml. of water. The white crystalline product which separated was collected by filtration, dried and recrystallized from an isopropyl ether-ethyl acetate mixture. The product weighed 1.3 g. (56% yield) and melted at 173–175° C.

*Analysis.*—Calculated for $C_{15}H_{17}F_3N_2O_2$ (percent): C, 57.32; H, 5.45; N, 8.91. Found (percent): C, 57.40; H, 5.41; N, 9.00.

EXAMPLE 3

8-carbamoyl-3β-(m-trifluoromethylphenoxy)nortropane

A stirred mixture of 4.1 g. (0.015 mole) of 3β-(m-trifluoromethylphenoxy)nortropane, 2.0 g. (0.018 mole) of nitrourea and 150 ml. of 95% ethanol was heated at 60° C. until the evolution of gas ceased. The mixture was then refluxed for 30 minutes, cooled, filtered and the solvent evaporated at reduced pressure. The residual oil which crystallized on cooling was recrystallized from an isopropyl ether-ethyl acetate mixture. The white product weighed 2.6 g. (55% yield) and melted at 143–147° C. The product melted at 149–152° C. after it was recrystallized slowly from the same solvent system.

*Analysis.*—Calculated for $C_{15}H_{17}N_2O_2F_3$ (percent): C, 57.32; H, 5.45; N, 8.91. Found (percent): C, 57.21; H, 5.39; N, 8.79.

EXAMPLE 4

8-(N-ethylcarbamoyl)-3α-(p-trifluoromethylphenoxy)nortropane

To a stirred solution of 2.0 g. (0.0074 mole) of 3α-(p-trifluoromethylphenoxy)nortropane in 50 ml. of benzene was added slowly a solution of 0.6 g. of ethyl isocyanate in 25 ml. of dry benzene. The reaction mixture was stirred at room temperature for 30 minutes and then the solvent was evaporated at reduced pressure. The residual oil which crystallized on cooling was recrystallized from isopropanol ether yielding 1.8 g. (71%) of white product which melted at 140–142° C.

*Analysis.*—Calculated for $C_{17}H_{21}F_3N_2O_2$ (percent): C, 59.54; H, 6.18; N, 8.18. Found (percent): C, 59.59; H, 6.20; N, 8.11.

Utilizing the process of Example 4 above, the following compounds are prepared from the stated ingredients:

8 - (N - ethylcarbamoyl) - 3α - (o - bromophenoxy) nortropane is prepared by reacting 3α - (o - bromophenoxy)nortropane and ethyl isocyanate;

8 - (N - methylthiocarbamoyl) - 3α - (p - chlorophenoxy) nortropane is prepared by reacting 3α - (p - chlorophenoxy)nortropane and methyl isothiocyanate; and 8 - (N - methylthiocarbamoyl) - 3α - phenoxynortropane is prepared by reacting 3α - phenoxynortropane and methyl isothiocyanate.

EXAMPLE 5

8-(N-methylcarbamoyl)-3α-(m-trifluoromethylphenoxy)nortropane

To a stirred solution of 4.1 g. (0.015 mole) of 3β-(m-trifluoromethylphenoxy)nortropane in 75 ml. of dry benzene was added slowly a solution of 0.9 g. (0.016 mole) of methylisocyanate in 25 ml. of dry benzene. The reaction mixture was stirred at room temperature for one hour and then the solvent was evaporated at reduced pressure. The residual oil which crystallized on standing was recrystallized twice from an isooctane-benzene mixture yielding 2.8 g. (57%) of white product melting at 155–157.5° C.

*Analysis.*—Calculated for $C_{16}H_{19}F_3N_2O_2$ (percent): C, 58.53; H, 5.83; N, 8.53. Found (percent): C, 58.74; H, 5.83; N, 8.40.

EXAMPLE 6

8-(N-methylcarbamoyl)-3β-(m-trifluoromethylphenoxy)nortropane

To a stirred solution of 4.1 g. (0.015 mole) of 3β-(m-trifluoromethylphenoxy)nortropane in 75 ml. of dry benzene was added slowly a solution of 0.9 g. (0.016 mole) of methylisocyanate in 25 ml. of dry benzene. The reaction mixture was stirred at room temperature for one hour and then the solvent was evaporated at reduced pressure. The residual oil which crystallized on standing was recrystallized from an isooctane-benzene mixture yielding 3.8 g. (77%) of white product melting at 158–159° C.

*Analysis.*—Calculated for $C_{16}H_{19}F_3N_2O_2$ (percent): C, 58.53; H, 5.83; N, 8.53. Found (percent): C, 58.56; H, 5.79; N, 8.45.

Utilizing the process of Example 6 above, the following compounds are prepared from the stated ingredients:

8 - (N - methylthiocarbamoyl) - 3β - (o - bromophenoxy) nortropane is prepared by reacting 3β - (o - bromophenoxy)nortropane and methyl isothiocyanate;

8 - (N - methylthiocarbamoyl) - 3β - (p - chlorophenoxy) nortropane is prepared by reacting 3β - (p - chlorophenoxy)nortropane and methyl isothiocyanate;

8 - (N - ethylcarbamoyl) - 3β - (p - trifluoromethylphenoxy)nortropane is prepared by reacting 3β - (p-triofluoromethylphenoxy)nortropane and ethyl isocyanate; and 8 - (N - ethylcarbamoyl) - 3β - phenoxynortropane is prepared by reacting 3β - phenoxynortropane and ethyl isocyanate.

EXAMPLE 7

8-(N-methylthiocarbamoyl)-3-β-(m-trifluoromethylphenoxy)nortropane

To a stirred solution of 5.4 g. (0.02 mole) of 3β-(m-trifluoromethylphenoxy)nortropane in 50 ml. of dry benzene at room temperature was added slowly a solution of 1.5 g. (0.02 mole) of methyl isothiocyanate in 25 ml. of dry benzene. The reaction mixture was stirred for one hour at ambient temperature, refluxed for one hour and the solvent evaporated at reduced pressure. The residual oil which crystallized on trituration with isooctane was recrystallized from an isooctane-isopropyl ether mixture, yielding 5.5 g. (80%) of white product melting at 132–

135° C. The product melted at 133–135.5° C. after it was recrystallized from the same solvent system.

*Analysis.*—Calculated for $C_{16}H_{19}F_3N_2OS$ (percent): C, 55.80; H, 5.56; N, 8.14. Found (percent): C, 55.97; H, 5.47; N, 7.76.

Utilizing the process of Example 7 described above, the following compounds are prepared from the stated ingredients:

8-(N - ethylthiocarbamoyl) - 3β - (m - trifluoromethylphenoxy)nortropane is prepared by reacting 3β-(m-trifluoromethylphenoxy)nortropane and ethyl isothiocyanate;

8-(N - phenylthiocarbamoyl) - 3β - (o - bromophenoxy)nortropane is prepared by reacting 3β-(o-bromophenoxy)nortropane and phenyl isothiocyanate; and 8 - (N - methylthiocarbamoyl)-3β-(o-bromophenoxy)nortropane is prepared by reacting 3β-(o-bromophenoxy)northropane and methyl isothiocyanate.

EXAMPLE 8

8-(N,N-dimethylcarbamoyl-3β-(m-trifluoromethylphenoxy)nortropane

A stirred mixture of 5.4 g. (0.020 mole) of 3β-(m-trifluoromethylphenoxy)nortropane, 2.6 g. (0.024 mole) of dimethylcarbamoyl chloride, 10 g. of potassium carbonate and 100 ml. of dry benzene was refluxed for 16 hours. The cooled mixture was treated with 100 ml. of water, the benzene layer was separated, washed with water, dried over magnesium sulfate and the benzene evaporated at reduced pressure. The residual oil was distilled at reduced pressure to give 40 g. (59% yield) of a viscous colorless oil (B.P. 146–148° C./0.05 mm.).

*Analysis.*—Calculated for $C_{17}H_{21}F_3N_2O_2$ (percent): C, 59.64; H, 6.18; N, 8.18. Found (percent): C, 59.44; H, 6.18; N, 7.93.

Utilizing the process of Example 8 above, the following compounds are prepared from the stated ingredients:

8 - (N,N - dimethylcarbamoyl)-3α-(o-bromophenoxy) nortropane is prepared by reacting dimethyl carbamoyl chloride and 3α-(o-bromophenoxy)nortropane;

8 - (N,N - diethylcarbamoyl) - 3α - (p-chlorophenoxy) nortropane is prepared by reacting diethyl carbamoyl chloride and 3α-(p-chlorophenoxy)nortropane;

8 - (N - methyl - N-phenylcarbamoyl)-3α-(m-trifluoromethylphenoxy)nortropane is prepared by reacting N-methyl-N-phenylcarbamoyl chloride and 3α-(m-trifluoromethylphenoxy)nortropane; and 8 - (N,N - diethylcarbamoyl) - 3β - (m-trifluoromethylphenoxy)nortropane is prepared by reacting N,N-diethylcarbamoyl chloride and 3β-(m-trifluoromethylphenoxy)nortropane.

*Formulation and administration.*—Effective quantities of any of the foregoing pharmacologically active compounds may be administered to a living animal body orally as capsules or tablets. Unit dosages are usually five milligrams or above and preferably twenty-five, fifty or one hundred milligrams depending, of course, upon the emergency of the situation and the particular result desired. Five to fifty milligrams appears optimum per unit dose, while usual broader ranges appear to be one to 100 milligrams per unit dose.

It is to be understood that the invention is not to be limited to the exact details of operation or exact compounds shown and described, as obvious modifications and equivolents will be apparent to one skilled in the art, and the invention is therefore to be limited only by the scope of the appended claims.

What is claim is:

1. A compound selected from 3-aryloxy-8-carbamoylnortropanes having the formula:

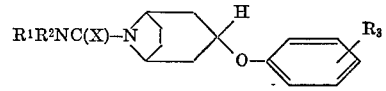

wherein:

$R^1$ and $R^2$ are each selected from the group consisting of hydrogen, lower alkyl and phenyl, $R^3$ is selected from the group consisting of hydrogen, trifluoromethyl, bromine and chlorine, and X is selected from the group consisting of oxygen and sulfur.

2. A compound of claim 1, wherein the 3-aryloxy-8-carbamoylnortropane has the alpha isomeric configuration.

3. A compound of claim 1, wherein the 3-aryloxy-8-carbamoylnortropane has the beta isomeric configuration.

4. A compound of claim 1, which is 8-carbamoyl-3α-(m-trifluoromethylphenoxy)nortropane.

5. A compound of claim 1, which is 8-carbamoyl-3α-(p-trifluoromethylphenoxy)nortropane.

6. A compound of claim 1, which is 8-carbamoyl-3β-(m-trifluoromethylphenoxy)nortropane.

7. A compound of claim 1, which is 8-(N-ethylcarbamoyl) - 3α - (p-trifluoromethylphenoxy)nortropane. pane.

8. A compound of claim 1, which is 8-(N-methylcarbamoyl) - 3α - (m-trifluoromethylphenoxy)nortropane.

9. A compound of claim 1, which is 8-(N-methylcarbamoyl)-3β-(m-trifluoromethylphenoxy)nortropane.

10. A compound of claim 1, which is 8-(N-methylthiocarbamoyl)-3β-(m-trifluoromethylphenoxy)nortropane.

11. A compound of claim 1, which is 8-(N,N-dimethylcarbamoyl)-3β-(m-trifluoromethylphenoxy)nortropane.

References Cited

UNITED STATES PATENTS

| | | | |
|---|---|---|---|
| 3,239,531 | 3/1966 | Jucker et al. | 260—292 |
| 3,445,470 | 5/1969 | Jucker et al. | 260—292 |

FOREIGN PATENTS

| | | | |
|---|---|---|---|
| 681,177 | 3/1964 | Canada | 260—292 |

ALAN L. ROTMAN, Primary Examiner

U.S. Cl. X.R.

424—265